United States Patent
Kim et al.

(10) Patent No.: US 10,344,361 B2
(45) Date of Patent: Jul. 9, 2019

(54) ULTRA-HIGH STRENGTH, HOT-DIP GALVANIZED STEEL SHEET HAVING EXCELLENT SURFACE QUALITY AND COATING ADHESION

(71) Applicant: POSCO, Pohang-si, Gyeongsangbuk-do (KR)

(72) Inventors: Myung-Soo Kim, Gwangyang-si (KR); Ki-Cheol Kang, Gwangyang-si (KR)

(73) Assignee: POSCO, Pohang-si, Gyeongsangbuk-do (KR)

( * ) Notice: Subject to any disclaimer, the term of this patent is extended or adjusted under 35 U.S.C. 154(b) by 0 days.

(21) Appl. No.: 15/534,295

(22) PCT Filed: Dec. 8, 2015

(86) PCT No.: PCT/KR2015/013399
§ 371 (c)(1),
(2) Date: Jun. 8, 2017

(87) PCT Pub. No.: WO2016/093598
PCT Pub. Date: Jun. 16, 2016

(65) Prior Publication Data
US 2017/0369974 A1    Dec. 28, 2017

(30) Foreign Application Priority Data

Dec. 8, 2014 (KR) .................. 10-2014-0174868

(51) Int. Cl.
*C22C 38/02*    (2006.01)
*C22C 38/06*    (2006.01)
(Continued)

(52) U.S. Cl.
CPC ............ *C22C 38/02* (2013.01); *B32B 15/012* (2013.01); *B32B 15/013* (2013.01); *B32B 15/04* (2013.01);
(Continued)

(58) Field of Classification Search
CPC ...... C21D 8/02; C21D 8/0237; C21D 8/0226; C21D 8/0236; C21D 8/0247;
(Continued)

(56) References Cited

U.S. PATENT DOCUMENTS

| 6,911,268 B2 | 6/2005 | Takada et al. |
| 9,028,973 B2 | 5/2015 | Takahashi et al. |

(Continued)

FOREIGN PATENT DOCUMENTS

| CN | 1483090 A | 3/2004 |
| CN | 103210105 A | 7/2013 |

(Continued)

OTHER PUBLICATIONS

Extended European Search Report dated Oct. 25, 2017 issued in European Application No. 15867752.6.
(Continued)

*Primary Examiner* — Michael E. La Villa
(74) *Attorney, Agent, or Firm* — Morgan Lewis & Bockius LLP

(57) ABSTRACT

The present invention relates to an ultra-high strength, hot-dip galvanized steel sheet having excellent surface quality and coating adherence and to a method for manufacturing thereof, the ultra-high strength, hot-dip galvanized steel sheet comprising: 0.1-0.3% by weight carbon (C); 0.1-2.0% by weight silicon (Si); 0.005-1.5% by weight aluminum (Al); 1.5-3.5% by weight manganese (Mn); 0.04% by weight or less phosphorus (P) (excluding 0% by weight); 0.015% by weight or less sulphur (S) (excluding 0% by weight); 0.02% by weight or less nitrogen (N) (excluding 0% by weight); the balance being Fe; and other inevitable impurities, and further comprising 0.01 wt.% to 0.07 wt.% of at least one kind of element selected from the group consisting of bismuth (Bi), tin (Sn) and antimony (Sb).

8 Claims, 2 Drawing Sheets

(51) Int. Cl.

| | | |
|---|---|---|
| C22C 38/04 | (2006.01) | |
| C22C 38/60 | (2006.01) | |
| C21D 8/02 | (2006.01) | |
| C23C 2/06 | (2006.01) | |
| B32B 15/00 | (2006.01) | |
| B32B 15/01 | (2006.01) | |
| B32B 15/04 | (2006.01) | |
| B32B 15/18 | (2006.01) | |
| C23C 28/02 | (2006.01) | |
| C23C 30/00 | (2006.01) | |
| C23C 2/12 | (2006.01) | |
| C23C 28/00 | (2006.01) | |
| C21D 6/00 | (2006.01) | |
| C23C 2/02 | (2006.01) | |
| C23C 2/28 | (2006.01) | |
| C23C 2/40 | (2006.01) | |
| C22C 38/00 | (2006.01) | |
| C22C 38/08 | (2006.01) | |
| C22C 38/12 | (2006.01) | |
| C22C 38/14 | (2006.01) | |
| C22C 38/16 | (2006.01) | |
| C22C 38/18 | (2006.01) | |
| C22C 38/28 | (2006.01) | |
| C22C 38/32 | (2006.01) | |
| C22C 38/34 | (2006.01) | |
| C22C 38/38 | (2006.01) | |
| C21D 8/04 | (2006.01) | |
| C21D 9/48 | (2006.01) | |
| C21D 9/56 | (2006.01) | |

(52) U.S. Cl.
CPC ............ *B32B 15/043* (2013.01); *B32B 15/18* (2013.01); *C21D 6/005* (2013.01); *C21D 6/008* (2013.01); *C21D 8/02* (2013.01); *C21D 8/0226* (2013.01); *C21D 8/0247* (2013.01); *C21D 8/0257* (2013.01); *C21D 8/0273* (2013.01); *C21D 8/0436* (2013.01); *C21D 8/0468* (2013.01); *C21D 8/0473* (2013.01); *C21D 9/48* (2013.01); *C21D 9/561* (2013.01); *C22C 38/001* (2013.01); *C22C 38/002* (2013.01); *C22C 38/008* (2013.01); *C22C 38/04* (2013.01); *C22C 38/06* (2013.01); *C22C 38/08* (2013.01); *C22C 38/12* (2013.01); *C22C 38/14* (2013.01); *C22C 38/16* (2013.01); *C22C 38/18* (2013.01); *C22C 38/28* (2013.01); *C22C 38/32* (2013.01); *C22C 38/34* (2013.01); *C22C 38/38* (2013.01); *C22C 38/60* (2013.01); *C23C 2/02* (2013.01); *C23C 2/06* (2013.01); *C23C 2/12* (2013.01); *C23C 2/28* (2013.01); *C23C 2/40* (2013.01); *C23C 28/021* (2013.01); *C23C 28/023* (2013.01); *C23C 28/025* (2013.01); *C23C 28/321* (2013.01); *C23C 30/00* (2013.01); *C23C 30/005* (2013.01); *C21D 2211/001* (2013.01); *C21D 2211/002* (2013.01); *C21D 2211/005* (2013.01); *C21D 2211/008* (2013.01); *Y10T 428/12757* (2015.01); *Y10T 428/12799* (2015.01); *Y10T 428/12951* (2015.01); *Y10T 428/12958* (2015.01); *Y10T 428/12972* (2015.01); *Y10T 428/26* (2015.01)

(58) Field of Classification Search
CPC ............... C21D 8/0257; C21D 8/0263; C21D 2211/005; C21D 2211/008; C21D 2211/001; C21D 2211/002; C21D 6/005; C21D 6/008; C21D 9/46; C21D 9/561; C21D 8/0273; C21D 8/0436; C21D 8/0468; C21D 8/0473; C21D 9/48; Y10T 428/12799; Y10T 428/12951; Y10T 428/12958; Y10T 428/12972; Y10T 428/12757; Y10T 428/26; C22C 38/02; C22C 38/04; C22C 38/60; C22C 38/06; C22C 38/001; C22C 38/002; C22C 38/008; C22C 38/08; C22C 38/12; C22C 38/14; C22C 38/16; C22C 38/18; C22C 38/28; C22C 38/32; C22C 38/34; C22C 38/38; C22C 38/20; C22C 38/22; C22C 38/24; C22C 38/26; B32B 15/013; B32B 15/012; B32B 15/04; B32B 15/043; B32B 15/18; C23C 2/02; C23C 2/28; C23C 2/40; C23C 2/06; C23C 2/12; C23C 28/021; C23C 28/023; C23C 28/025; C23C 28/321; C23C 30/00; C23C 30/005
See application file for complete search history.

(56) References Cited

U.S. PATENT DOCUMENTS

| | | | |
|---|---|---|---|
| 2002/0160221 A1 | 10/2002 | Takeda et al. | |
| 2006/0011274 A1 | 1/2006 | Speer et al. | |
| 2006/0292391 A1 | 12/2006 | Ikematsu et al. | |
| 2008/0053576 A1* | 3/2008 | Takada ............... | C21D 8/0273 148/533 |
| 2008/0295928 A1 | 12/2008 | Kim et al. | |
| 2011/0030857 A1 | 2/2011 | Kwak et al. | |
| 2011/0064968 A1 | 3/2011 | Kim et al. | |
| 2018/0002790 A1* | 1/2018 | Kim ..................... | C21D 8/02 |

FOREIGN PATENT DOCUMENTS

| | | | |
|---|---|---|---|
| EP | 1960562 A1 | 8/2008 | |
| EP | 2371978 A1 * | 10/2011 | .......... C21D 8/0215 |
| EP | 2634281 A1 | 9/2013 | |
| JP | 2002-322551 A | 11/2002 | |
| JP | 2005-139485 A | 6/2005 | |
| JP | 2010-116590 A | 5/2010 | |
| JP | 2010-121174 A | 6/2010 | |
| JP | 2010-215998 A | 9/2010 | |
| JP | 2011-153367 A | 8/2011 | |
| JP | 2011-153368 A | 8/2011 | |
| JP | 2011-231367 A | 11/2011 | |
| JP | 2014-009377 A | 1/2014 | |
| KR | 10-1994-002370 A | 2/1994 | |
| KR | 10-0711468 B1 | 4/2007 | |
| KR | 2009-0006881 A | 1/2009 | |
| KR | 10-2009-0068993 A | 6/2009 | |
| KR | 10-2010-0030627 A | 3/2010 | |
| KR | 10-2013-0086062 A | 7/2013 | |
| KR | 10-2014-0131203 A | 11/2014 | |
| WO | 2004/063410 A1 | 7/2004 | |
| WO | 2008/078912 A1 | 7/2008 | |
| WO | 2009/004426 A1 | 1/2009 | |

OTHER PUBLICATIONS

Chinese Office Action dated Feb. 5, 2018 issued in Chinese Patent Application No. 201580067007.8 (with English translation).
E. De Moor, et al., "Effect of Carbon and Manganese on the Quenching and Partitioning Response of CMnSi Steels," ISIJ International, vol. 51, 2011, No. 1, pp. 137-144.
Japanese Office Action dated Aug. 21, 2018 issued in Japanese Patent Application No. 2017-530129.
Office Action issued in Chinese Application No. 201580067007.8 dated Nov. 5, 2018.

(56) References Cited

OTHER PUBLICATIONS

International Search Report dated Mar. 11, 2016 issued in International Patent Application No. PCT/KR2015/013399 (with English translation).

* cited by examiner

ULTRA-HIGH STRENGTH, HOT-DIP GALVANIZED STEEL SHEET HAVING EXCELLENT SURFACE QUALITY AND COATING ADHESION

CROSS REFERENCE

This patent application is the U.S. National Phase under 35 U.S.C. § 371 of International Application No. PCT/KR2015/013399, filed on Dec. 8, 2015, which claims the benefit of Korean Patent Application No. 10-2014-0174868, filed on Dec. 8, 2014, the entire contents of each are hereby incorporated by reference.

TECHNICAL FIELD

The present disclosure relates to an ultra-high strength, hot-dip galvanized steel sheet having excellent surface quality and coating adhesion (plating adhesion), and a method for manufacturing the ultra-high strength, hot-dip galvanized steel sheet.

BACKGROUND ART

Recently, many efforts have been made to develop thin, lightweight steel sheets for construction materials and automobile or transportation vehicle members. Such steel sheets are required to have higher strength, for high durability.

However, an increase in the strength of the steel sheets may result in a decrease in the ductility of the steel sheets. Thus, there is a need for materials to help deal with this inverse relationship.

To satisfy this need, much research has been conducted into improving the strength-ductility relationship of steel sheets and, as a result, phase-transformation steels having retained austenite, in addition to low-temperature microstructures, martensite and bainite, have been developed. Examples of the phase-transformation steels include so-called dual phase (DP) steel, transformation induced plasticity (TRIP) steel, and complex phase (CP) steel. Mechanical characteristics such as tensile strength and elongation of phase-transformation steels vary according to the kinds and fractions of a parent phase and a secondary phase and, particularly, TRIP steel including retained austenite has a relatively high tensile strength-elongation balance (TS×El).

Since CP steel, a kind of phase-transformation steel, has a relatively low elongation compared to other steels, CP steel is processable only through simple processes such as a roll forming process. High-ductility DP steel and TRIP steel are processable through processes such as a cold pressing process.

In addition to the above-described phase-transformation steels, Patent Document 1 discloses twining induced plasticity (TWIP) steel, to which carbon (C) and manganese (Mn) are added in large amounts to obtain an austenitic single phase. TWIP steel has a tensile strength-elongation balance (TS×El) within the range of 50,000 MPa % or greater, that is, satisfactory material characteristics.

Such TWIP steel is required to have Mn in an amount of about 25 wt % or greater if the content of C is 0.4 wt %, and in an amount of 20 wt % or greater if the content of C is 0.6 wt %.

If TWIP steel does not satisfy these element content ranges, austenite inducing twining is not stably formed in a parent phase, but ε-martensite having an HCP structure and α'-martensite having a BCT structure are formed in the parent phase, markedly reducing the workability of the TWIP steel. To prevent this, large amounts of austenite-stabilizing elements may be added to stabilize austenite at room temperature. However, if large amounts of such alloying elements are added to TWIP steel, it may be difficult to perform processes such as a casting process and a rolling process on the TWIP steel because of problems caused by the alloying elements and, economically, the alloying elements may increase the manufacturing costs of the TWIP steel significantly.

Thus, there have been attempts to develop so-called "3rd generation- or eXtra-advanced high strength steel (X-AHSS)" having higher ductility than DP steel and TRIP steel or incurring lower manufacturing costs than TWIP steel, even while having lower ductility than TWIP steel. However, results of the attempts have not yet been successful.

In more detail, Patent Document 2 discloses a method (a quenching and partitioning (Q&P) process) for forming retained austenite and martensite as main microstructures. However, as described in Non-patent Document 1, introducing a method of manufacturing a steel sheet using such a method, if the content of C in a steel sheet is low, at about 0.2%, the yield strength of the steel sheet is very low, at about 400 MPa, and the elongation of a final product is merely similar to that of TRIP steel. In addition, although a method of markedly increasing the yield strength of a steel sheet by increasing the amounts of alloying elements, C and Mn, has been introduced, this method decreases weldability because of excessive amounts of the alloying elements.

Meanwhile, alloying elements such as silicon (Si), manganese (Mn), and aluminum (Al) may be added to steel so as to manufacture a high-strength steel sheet having high ductility. However, a high-strength steel sheet including easily oxidizable Si, Mn, and Al may react with even a small amount of oxygen or vapor existing in an annealing furnace, and thus a single oxide of Si, Mn, or Al, or a complex oxide thereof may be formed on the surface of the high-strength steel sheet. This oxide may decrease the wettability of the high-strength steel sheet with zinc (Zn), and thus the high-strength steel sheet may not be plated with Zn in a local region or in the entire region thereof. That is, plating failure may occur locally or in the entirety of a region, and thus the surface quality of the plated high-strength steel sheet may decrease markedly.

In addition, oxides exiting between a plating layer and a steel sheet may decrease the adhesion between the plating layer and the steel sheet, and thus when the steel sheet is processed through a forming process, the plating layer may be separated from the steel sheet, that is, plating separation may occur.

In particular after annealing, the formation of a single oxide of Si, Mn, or Al, or a complex oxide thereof, increases in proportion to the amounts of oxidizable elements such as Si, Mn, and Al. Thus, these problems of plating failure and separation may occur more seriously in high-strength steel sheets having a strength grade of 780 MPa or greater.

To address these problems, Patent Document 3 discloses a hot-dip galvanizing method including: a process of forming iron (Fe) oxides including a single oxide of Si, Mn, or Al, or a complex oxide thereof in a steel sheet, is formed? to a certain depth by directly oxidizing the steel sheet in an oxidizing atmosphere of a direct flame furnace, while annealing the steel sheet at an air fuel ratio of 0.80 to 0.95; a process of annealing and reducing the steel sheet in a reducing atmosphere to reduce the Fe oxides; and a process of hot-dip galvanizing the steel sheet.

In the above-described method, the steel sheet is heated at a high oxygen partial pressure, to induce oxidation of Fe, and thus an oxide layer is formed to a certain depth in a surface region of the steel sheet. In the oxide layer, oxides of elements that are more oxidizable than Fe are formed, and thus Fe does not diffuse to the surface of the steel sheet. However, easily oxidizable elements, that is, Si, Mn, and/or Al, included in the steel sheet below the oxide layer may be diffused to the surface region of the steel sheet as a heating temperature and time increase. At the interface between the oxide layer and the steel sheet, the diffusion may be blocked by the oxide layer, and Fe oxides may react with Si, Mn, and/or Al, thereby reducing the Fe oxides into Fe and forming a single oxide of Si, Mn, or Al, or a complex oxide thereof. Therefore, after annealing, a reduced Fe layer partially including a single oxide or a complex oxide of Si, Mn, and/or Al may be formed in the uppermost surface region of the steel sheet, and an oxide layer formed by the single oxide or complex oxide of Si, Mn, and/or Al may be located below the reduced Fe layer.

Therefore, if a hot-dip galvanized steel sheet is manufactured by oxidizing and then reducing a steel sheet in an annealing process as described above, due to an oxide layer formed below a reduced Fe layer, that is, formed between the reduced Fe layer and the steel sheet, the adhesion between the reduced Fe layer and the steel sheet may be markedly decreased when the steel sheet is processed through a press working process.

RELATED ART DOCUMENTS (Patent Document 1) Korean Patent Application Laid-open Publication No. 1994-0002370
(Patent Document 2) US Patent Application Publication No. 2006-0011274
(Patent Document 3) Korean Patent Application Laid-open Publication No. 2010-0030627
(Non-patent Document 1) (Paper 1) ISIJ International, Vol.51, 2011, p.137-144

DISCLOSURE

Technical Problem

Aspects of the present disclosure may provide a hot-dip galvanized steel sheet and a method for manufacturing the hot-dip galvanized steel sheet. The hot-dip galvanized steel sheet may be manufactured using steel having at least one element selected from the group consisting of bismuth (Bi), tin (Sn), and antimony (Sb) in a certain amount through a primary annealing process for ensuring a fraction of a low-temperature microstructure in the steel sheet, and a secondary annealing process for improving the formability of the steel sheet by imparting high tensile strength and ductility to the steel sheet. In addition, the hot-dip galvanized steel sheet may have a high degree of surface quality, and a high degree of coating adhesion (plating adhesion) to prevent plating separation during a forming process.

Technical Solution

According to an aspect of the present disclosure, an ultra-high strength, hot-dip galvanized steel sheet having high surface quality and coating adhesion may include, by wt %, carbon (C): 0.1% to 0.3%, silicon (Si) : 0.1% to 2.0%, aluminum (Al): 0.005% to 1.5%, manganese (Mn): 1.5% to 3.5%, phosphorus (P): 0.04% or less (excluding 0%), sulfur (S): 0.015% or less (excluding 0%), nitrogen (N): 0.02% or less (excluding 0%), and a balance of iron (Fe) and inevitable impurities, wherein the ultra-high strength, hot-dip galvanized steel sheet may further include at least one element selected from the group consisting of bismuth (Bi), tin (Sn), and antimony (Sb) in an amount of 0.01 wt % to 0.07 wt %.

The ultra-high strength, hot-dip galvanized steel sheet may have a total content of Si and Al in an amount of 1.0 wt % or greater.

The ultra-high strength, hot-dip galvanized steel sheet may have a microstructure including, by area fraction, polygonal ferrite in an amount of 5% or less, acicular ferrite in an amount of 70% or less, acicular retained austenite in an amount of 25% or less (excluding 0%), and a balance of martensite.

The ultra-high strength, hot-dip galvanized steel sheet may include a base steel sheet and a galvanized layer formed on the base steel sheet, wherein a degree of concentration of at least one element selected from the group consisting of Bi, Sn, and Sb, in a region of the base steel sheet defined as being from the location of an interface between the base steel sheet and the galvanized layer to a depth of 0 to 0.1 μm, may be 2 times to 20 times a degree of concentration of the at least one element in a region of the base steel sheet defined to be within a depth range of 0.2 μm or greater.

The ultra-high strength, hot-dip galvanized steel sheet may have a tensile strength of 780 MPa or greater.

The ultra-high strength, hot-dip galvanized steel sheet may further include, by wt %, at least one element selected from the group consisting of titanium (Ti): 0.005% to 0.1%, niobium (Nb): 0.005% to 0.1%, vanadium (V): 0.005% to 0.1%, zirconium (Zr): 0.005% to 0.1%, and tungsten (W): 0.005% to 0.5%.

The ultra-high strength, hot-dip galvanized steel sheet may further include, by wt %, at least one element selected from the group consisting of molybdenum (Mo): 1% or less (excluding 0%), nickel (Ni): 1% or less (excluding 0%), copper (Cu): 0.5% or less (excluding 0%), and chromium (Cr) : 1% or less (excluding 0%).

The ultra-high strength, hot-dip galvanized steel sheet may further include, by wt %, at least one element selected from the group consisting of calcium (Ca): 0.01% or less (excluding 0%), and boron (B): 0.01% or less (excluding 0%).

According to another aspect of the present disclosure, there may be provided a method for manufacturing an ultra-high strength, hot-dip galvanized steel sheet having high surface quality and coating adhesion, the method including: preparing a slab, the slab including, by wt %, carbon (C): 0.1% to 0.3%, silicon (Si): 0.1% to 2.0%, aluminum (Al): 0.005% to 1.5%, manganese (Mn): 1.5% to 3.5%, phosphorus (P): 0.04% or less (excluding 0%), sulfur (S): 0.015% or less (excluding 0%), nitrogen (N): 0.02% or less (excluding 0%), and a balance of iron (Fe) and inevitable impurities, wherein the slab may further include at least one element selected from the group consisting of bismuth (Bi), tin (Sn), and antimony (Sb) in an amount of 0.01 wt % to 0.07 wt %; reheating the slab to a temperature range of 1000° C. to 1300° C.; hot rolling the reheated slab at a finish rolling temperature of 800° C. to 950° C.; coiling the hot-rolled steel sheet at a temperature of 750° C. or less; cold rolling the coiled hot-rolled steel sheet; primary-annealing the cold-rolled steel sheet under an $H_2$-$N_2$ gas atmosphere having a dew point of −45° C. or less by heating the cold-rolled steel sheet to a temperature of Ac3 or higher, maintaining the cold-rolled steel sheet at the temperature, and cooling the cold-rolled steel sheet; secondary-annealing the primary-annealed steel sheet under an H2-H2 gas atmosphere having a dew point of −20° C. to 60° C. by heating the steel sheet to a temperature range of Ac1 to Ac3, maintaining the steel sheet in the heating temperature range, cooling the steel sheet at an average cooling rate of 20° C/s or greater to a temperature range of a martensite start temperature (Ms) to a martensite finish temperature (Mf), reheating the steel sheet to a temperature range of Ms or higher, and maintaining the steel sheet in the reheating temperature range for one second or longer; and hot-dip galvanizing the secondary-annealed steel sheet.

The cold rolling may be performed at a reduction ratio of 25% or greater.

In the primary annealing, the $H_2$-$N_2$ gas atmosphere may include hydrogen in an amount of 2 vol % or greater.

After the primary annealing, the cold-rolled steel sheet may have a microstructure including at least one selected from the group consisting of bainite and martensite in an amount of 90% or greater by area fraction.

After the primary annealing, the method may further include pickling the primary-annealed steel sheet.

In the secondary annealing, the $H_2$-$N_2$ gas atmosphere may include hydrogen in an amount of 3 vol % or greater.

The above-described aspects of the present disclosure do not include all aspects or features of the present disclosure. Other aspects or features, and effects of the present disclosure, will be clearly understood from the following descriptions of exemplary embodiments.

Advantageous Effects

Since the hot-dip galvanized steel sheet of the present disclosure has high tensile strength and ductility, the hot-dip galvanized steel sheet may have high formability. In addition, the hot-dip galvanized steel sheet may have high surface quality and coating adhesion (plating adhesion), and thus plating separation may not occur when the hot-dip galvanized steel sheet is processed in a forming process. Therefore, the hot-dip galvanized steel sheet may be used in various industrial applications, such as construction members and automotive steel sheets.

BEST MODE

Figure 1A:
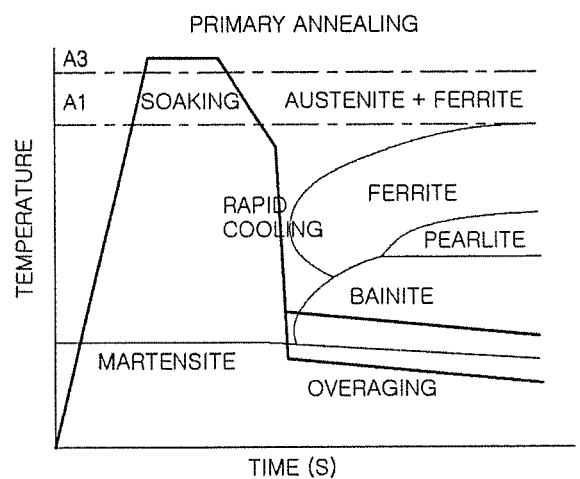
FIG. 1A illustrates an example of a primary annealing process according to an embodiment of the present disclosure.

Embodiments of the present disclosure will now be described in detail. The disclosure may, however, be exemplified in many different forms and should not be construed as being limited to the specific embodiments set forth herein. Rather, these embodiments are provided so that this disclosure will be thorough and complete, and will fully convey the scope of the present invention to those skilled in the art.

The inventors have repeatedly conducted research into developing a hot-dip galvanized steel sheet having high surface quality and coating adhesion (plating adhesion), in addition to having high tensile strength and improved ductility. As a result, the inventors have found that these objects could be achieved by performing a primary annealing process on a steel sheet having a certain amount of at least one element selected from the group consisting of bismuth (Bi), tin (Sn), and antimony (Sb), to ensure a predetermined fraction of a low-temperature microstructure in the steel sheet, and then performing a secondary annealing process on the steel sheet.

In detail, according to an embodiment of the present disclosure, an ultra-high strength, hot-dip galvanized steel sheet having excellent surface quality and coating adhesion includes, by wt %, carbon (C): 0.1% to 0.3%, silicon (Si): 0.1% to 2.0%, aluminum (Al): 0.005% to 1.5%, manganese (Mn): 1.5% to 3.5%, phosphorus (P): 0.04% or less (excluding 0%), sulfur (S): 0.015% or less (excluding 0%), nitrogen (N): 0.02% or less (excluding 0%), and a balance of iron (Fe) and inevitable impurities, wherein the ultra-high strength, hot-dip galvanized steel sheet further includes at least one element selected from the group consisting of bismuth (Bi), tin (Sn), and antimony (Sb) in an amount of 0.01 wt % to 0.07 wt %.

Hereinafter, the ultra-high strength, hot-dip galvanized steel sheet having excellent surface quality and coating adhesion will be described in detail according to the embodiment of the present disclosure.

First, the composition of the hot-dip galvanized steel sheet, and reasons for limiting the composition of the hot-dip galvanized steel sheet, will be described.

Carbon (C): 0.1 wt % to 0.3 wt %

Carbon (C) is an element effective in improving the strength of steel. In the embodiment, C is a key element added to stabilize retained austenite and guarantee strength. It may be preferable that the content of C be 0.1 wt % or greater to achieve the above-described objects. However, if the content of C is greater than 0.3 wt %, the possibility of slab defects may increase, and weldability may markedly decrease. Therefore, according to the embodiment, it may be preferable that the content of C be within the range of 0.1 wt % to 0.3 wt %.

Silicon (Si): 0.1 wt % to 2.0 wt %

Silicon (Si) suppresses the precipitation of carbides in ferrite and facilitates diffusion of C from ferrite into austenite, thereby stabilizing retained austenite. It may be preferable that the content of Si be 0.1 wt % or greater to achieve the above-described objects. However, if the content of Si is greater than 2.0 wt %, hot rollability and cold rollability may decrease, and platability may decrease because of the formation of surface oxides. Therefore, according to the embodiment, it may be preferable that the content of Si be within the range of 0.1 wt % to 2.0 wt %.

Aluminum (Al): 0.005 wt % to 1.5 wt %

Aluminum (Al) functions as a deoxidizer by combining with oxygen included in steel. To this end, it may be preferable that the content of Al be 0.005 wt % or greater. In addition, like Si, Al suppresses the formation of carbides in ferrite and thus stabilizes retained austenite. However, if the content of Al is greater than 1.5 wt %, it may be difficult to produce satisfactory slabs because Al reacts with a mold flux during a casting process, and platability may decrease because Al forms surface oxides, just as Si does. Therefore, according to the embodiment, it may be preferable that the content of Al be within the range of 0.005 wt % to 1.5 wt %.

In the embodiment, Si and Al are elements stabilizing retained austenite and, so as to effectively obtain this effect, it may be preferable that the total content of Si an Al be 1.0 wt % or greater.

Manganese (Mn): 1.5 wt % to 3.5 wt %

Manganese (Mn) is an element effective in forming and stabilizing retained austenite while controlling transformation of ferrite. If the content of Mn is less than 1.5 wt %, transformation of ferrite may occur excessively, and thus it may be difficult to manufacture a steel sheet having an intended degree of strength. In addition, if the content of Mn is greater than 3.5 wt %, phase transformation may be markedly delayed when a heat treatment is performed in a secondary annealing process, according to an embodiment of the present disclosure, and thus martensite may be formed in large amounts, thereby making it difficult to manufacture a steel sheet having an intended degree of ductility. Therefore, according to the embodiment, it may be preferable that the content of Mn be within the range of 1.5 wt % to 3.5 wt %.

Phosphorus (P): 0.04 wt % or less (excluding 0%)

Phosphorus (P) is an element for solid-solution strengthening. However, if the content of P in steel is greater than 0.04 wt %, the weldability of the steel decreases, and the brittleness of the steel may increase. Therefore, it may be preferable that the content of P be 0.04 wt % or less, and, more preferably 0.02 wt % or less.

Sulfur (S): 0.015 wt % or less (excluding 0%)

Sulfur (S) is an impurity inevitably included in steel, and the content of S is adjusted to be as low as possible. Theoretically, it is preferable that the content of S be 0%. However, S is inevitably included during manufacturing processes, and thus the upper limit of the content of S is set. If the content of S is greater than 0.015 wt %, the ductility and weldability of the steel sheet is likely to decrease. Therefore, in the embodiment, it may be preferable that the content of S be 0.015 wt % or less.

Nitrogen (N): 0.02 wt % or less (excluding 0%)

Although nitrogen (N) is effective in stabilizing austenite, if the content of N in steel is greater than 0.02 wt %, the steel may become brittle, and N may react with Al to result in excessive precipitation of AlN and deterioration in continuous casting quality. Therefore, in the embodiment, it may be preferable that the content of N be 0.02 wt % or less.

Preferably, the hot-dip galvanized steel sheet of the embodiment may include at least one element selected from the group consisting of bismuth (Bi), tin (Sn), and antimony (Sb) in an amount of 0.01 wt % to 0.07 wt %. As described above, according to the embodiment of the present disclosure, at least one element selected from the group consisting of Bi, Sn, and Sb may be added to the hot-dip galvanized steel sheet. Hereinafter, reasons for adding the at least one element and limiting the content thereof will be described in detail.

Large amounts of Mn, Si, and Al are added to produce steel sheets having high strength and toughness like the steel sheet of the embodiment. If an annealing process for reduction and recrystallization is performed on such a steel sheet, Mn, Si, and Al included in the steel sheet may diffuse to the surface of the steel sheet and may form oxides.

In particular, if the total content of Si and Al in a steel sheet is greater than 1 wt %, as in the embodiment, complex oxides of Mn, Si, and Al having high contents of Si and Al may be formed on the surface of the steel sheet in a reticular shape. In this case, most of the surface of the steel sheet may be covered with oxides after annealing, and thus when the steel sheet is dipped in a galvanizing bath, the wettability of the steel sheet with zinc (Zn) may be markedly low.

In the embodiment, however, at least one element selected from the group consisting of Bi, Sn, and Sb is added in an amount of 0.01 wt % to 0.07 wt %, thus, if a galvanizing process is performed after a primary annealing process and a secondary annealing process are performed, under conditions to be described later, the amount of at least one element selected from the group consisting of Bi, Sn, and Sb, concentrated in a region of a base steel sheet defined to be from the interface between a galvanized layer and the base steel sheet to a depth of 0.1 μm, may be two or more times the amount of the at least one element, concentrated in a region of the base steel sheet, having a depth of 0.2 μm or greater. In this case, since at least one element selected from the group consisting of Bi, Sn, and Sb is concentrated in a surface region of the base steel sheet, diffusion of Si, Al, and Mn to the surface of the base steel sheet is blocked, and the formation of complex oxides on the surface of the steel sheet may be suppressed. Therefore, after annealing, the amounts of complex oxides of Si, Al, and Mn concentrated on the surface of the steel sheet are reduced, and thus the wettability of the steel sheet with molten Mn may be improved in a galvanizing bath. As a result, a hot-dip galvanized steel sheet free from plating failure and having high surface quality may be obtained. In addition, an Fe—Al alloy may be easily formed on the interface between the base steel sheet and the galvanized layer through a reaction between Al included in a plating bath and Fe included in the base steel sheet, and thus coating adhesion may be markedly improved.

In addition, as described above, at least one element selected from the group consisting of Bi, Sn, and Sb may be added, preferably in an amount of 0.01 wt % to 0.07 wt %. If the added amount of at least one element selected from the group consisting of Bi, Sn, and Sb is less than 0.01 wt %, the amount of the at least one element concentrated in a region of the base steel sheet, defined to be from the interface between the galvanized layer and the base steel sheet to a depth of 0.1 μm, may be less than twice the amount of the at least one element concentrated in a region of the base steel sheet having a depth of 0.2 μm or greater, and thus platability and coating adhesion may not be significantly improved. In addition, if the added amount of the at least one element is greater than 0.07 wt %, the brittleness of the steel sheet may increase, that is, the ductility of the steel sheet may decrease. Therefore, it may be preferable that the content of at least one element selected from the group consisting of Bi, Sn, and Sb be within the range of 0.01 wt % to 0.07 wt %.

In addition to the above-described elements, the base steel sheet of the hot-dip galvanized steel sheet of the embodiment may further include at least one element selected from the group consisting of titanium (Ti), niobium (Nb), vanadium (V), zirconium (Zr), and tungsten (W), for improvements in strength. The contents of these elements may be as follows.

Titanium (Ti): 0.005 wt % to 0.1 wt %
Niobium (Nb): 0.005 wt % to 0.1 wt %
Vanadium (V): 0.005 wt % to 0.1 wt %
Zirconium (Zr): 0.005 wt % to 0.1 wt %
Tungsten (W): 0.005 wt % to 0.5 wt %

Ti, Nb, V, Zr, and W are elements effective in improving precipitation strengthening and grain refinement, and if the content of each of the elements is less than 0.005 wt %, it may be difficult to obtain these effects. In addition, if the content of each of Ti, Nb, V, and Zr is greater than 0.1 wt %, and/or the content of W is greater than 0.5 wt %, manufacturing costs may markedly increase, and the ductility of the steel sheet may markedly decrease because of excessive precipitation.

In addition, the hot-dip galvanized steel sheet of the embodiment may further include at least one element selected from the group consisting of molybdenum (Mo), nickel (Ni), copper (Cu), and chromium (Cr). The contents of these elements may be as follows.

Molybdenum (Mo): 1 wt % or less (excluding 0%)
Nickel (Ni): 1 wt % or less (excluding 0%)
Copper (Cu): 0.5 wt % or less (excluding 0%)
Chromium (Cr): 1 wt % or less (excluding 0%)

Mo, Ni, Cu, and Cr are elements stabilizing retained austenite. Mo, Ni, Cu, and Cr stabilize retained austenite in combination with elements such as C, Si, Mn, or Al. If the content of each of Mo, Ni, and Cr is greater than 1 wt %, and/or the content of Cu is greater than 0.5 wt %, manufacturing costs may excessively increase, and thus the upper limits of the contents of Mo, Ni, Cu, and Cr are set as described above.

In this case, Cu added to the steel sheet may cause problems related with brittleness during a hot rolling process, and thus Cu may be added, together with Ni.

In addition, the hot-dip galvanized steel sheet of the embodiment may further include at least one element selected from the group consisting of calcium (Ca) and boron (B). The contents of these elements may be as follows.

Calcium (Ca): 0.01% or less (excluding 0%)
Boron (B): 0.01% or less (excluding 0%)

In the embodiment of the present disclosure, Ca is an element improving workability by controlling the shape of sulfides. If the content of Ca is greater than 0.01 wt %, this effect may be saturated, and thus it may be preferable that the upper limit of the content of Ca be 0.01 wt %.

In addition, B improves hardenability in combination with Mn and/or Cr, thereby suppressing transformation of soft ferrite at high temperatures. However, if the content of B is greater than 0.01 wt %, B is excessively concentrated on the surface of the steel sheet during a plating process, and thus coating adhesion is lowered. Thus, it may be preferable that the upper limit of the content of B be 0.01 wt %.

In the embodiment of the present disclosure, the base steel sheet includes iron (Fe), in addition to the above-described elements. However, impurities of raw materials or steel manufacturing environments may be included inevitably in the base steel sheet, and such impurities may not be removed from the base steel sheet. Such impurities are well-known to those of ordinary skill in the steel manufacturing industry, and thus descriptions thereof will not be provided in the present disclosure.

In addition to having the above-described composition, the hot-dip galvanized steel sheet of the embodiment may have a microstructure including, by area fraction, polygonal ferrite in an amount of 5% or less, acicular ferrite in an amount of 70% or less, acicular retained austenite in an amount of 25% or less (excluding 0%), and the balance of martensite. Herein, the polygonal ferrite refers to ferrite having a short axis/long axis ratio greater than 0.4, and the acicular ferrite refers to ferrite having a short axis/long axis ratio of 0.4 or less.

In the embodiment, the polygonal ferrite reduces the yield strength of the hot-dip galvanized steel sheet. Preferably, the area fraction of the polygonal ferrite may be adjusted to be 5% or less. If the yield strength of the hot-dip galvanized steel sheet of the embodiment is low, the hot-dip galvanized steel sheet may be easily applied to structural members.

According to the embodiment, since martensite is partially formed due to to a secondary annealing process (to be described later), the total area fraction of the acicular ferrite and the acicular retained austenite may preferably be 95% or less, and martensite may be included as a remainder.

In this case, the acicular ferrite and the acicular retained austenite are the main microstructures of the hot-dip galvanized steel sheet of the embodiment, and, due to the main microstructures, the strength and ductility of the hot-dip galvanized steel sheet may be securely guaranteed. Although the acicular retained austenite is a microstructure for improving balance between strength and ductility, if the area fraction of the acicular retained austenite is excessive, that is, greater than 25%, the acicular retained austenite may not be sufficiently stable, because of dispersion and diffusion of C. Therefore, in the embodiment of the present disclosure, it may be preferable that the area fraction of the acicular retained austenite be 25% or less.

In addition, the acicular ferrite includes bainite, formed during a secondary annealing process (to be described later), including a heat treatment at an annealing temperature, cooling to a temperature range of Ms to Mf, and reheating. In the embodiment, unlike with normal bainite, bainite does not have carbide precipitates, owing to the addition of Si and Al, and thus bainite may be defined as acicular ferrite having a short axis/long axis ratio of 0.4 or less. During the secondary annealing process, in practice, it is not easy to distinguish acicular ferrite formed in the heat treatment performed at the annealing temperature from acicular ferrite (bainite in which carbides do not precipitate) formed in the reheating after the cooling to the temperature range of a martensite start temperature (Ms) to a martensite finish temperature (Mf).

The hot-dip galvanized steel sheet of the embodiment satisfying the above-described composition includes a base steel sheet and a galvanized layer, and, preferably, the content of at least one element selected from the group consisting of Bi, Sn, and Sb, in a region of the base steel sheet from the interface between the base steel sheet and the galvanized layer to a depth of 0 μm to 0.1 μm, may be 2 times to 20 times the content of the at least one element in a region of the base steel sheet having a depth of 0.2 μm or greater. That is, when the degree of concentration of the at least one element is two or more times that of the content of the at least one element in a region of the base steel sheet having a depth of 0.2 μm or greater, the hot-dip galvanized steel sheet may have high surface quality and coating adhesion. In the embodiment, the degree of concentration refers to the concentrated amount of at least one element selected from the group consisting of Bi, Sn, and Sb, that is, the amount of a concentrated element. As the content of at least one element selected from the group consisting of Bi, Sn, and Sb in a region of the base steel sheet from the interface between the base steel sheet and the galvanized layer to a depth of 0 μm to 0.1 μm is greater than the content of the at least one element in a region of the base steel sheet having a depth of 0.2 μm or greater, the surface quality of the hot-dip galvanized steel sheet may be improved. However, if the at least one element is excessively concentrated in a surface region of the base sheet, fine cracks may be formed in weld zones of the base steel sheet during a welding process. Thus, preferably, the degree of concentration of at least one element may be adjusted to be twenty times or less that of the content of the at least one element in a region of the base steel sheet having a depth of 0.2 μm or greater. The exact cause of fine cracks in weld zones has not yet been found. However, the inventors presume, based on research, that cracks are caused by Bi, Sb, and/or Sn having a low melting point and liquefying at a high temperature during a welding process.

According to the embodiment, the hot-dip galvanized steel sheet having the above-described composition and microstructure may have a tensile strength within the range of about 780 MPa or greater, and, more specifically, within the range of about 780 MPa to about 1800 MPa or within the range of about 780 MPa to about 1500 MPa. In addition, since the hot-dip galvanized steel sheet of the embodiment has the high tensile strength and ductility described above, the hot-dip galvanized steel sheet may have high formability. In addition, the hot-dip galvanized steel sheet has high surface quality and coating adhesion, and thus plating separation may not occur when the hot-dip galvanized steel sheet is processed in a forming process.

Hereinafter, a method for manufacturing an ultra-high strength, hot-dip galvanized steel sheet having excellent surface quality and coating adhesion will be described in detail, according to an embodiment of the present disclosure.

According to the embodiment of the present disclosure, a hot-dip galvanized steel sheet may be manufactured by processing a steel slab having the above-described composition through a reheating process, a hot rolling process, a coiling process, a cold rolling process, a primary annealing process, a pickling process, a secondary annealing process, and a plating process.

In detail, the method of manufacturing an ultra-high strength, hot-dip galvanized steel sheet having excellent surface quality and coating adhesion may include: a process of preparing a slab, the slab including, by wt %, carbon (C): 0.1% to 0.3%, silicon (Si): 0.1% to 2.0%, aluminum (Al): 0.005% to 1.5%, manganese (Mn): 1.5% to 3.5%, phosphorus (P): 0.04% or less (excluding 0%), sulfur (S): 0.015% or less (excluding 0%), nitrogen (N): 0.02% or less (excluding 0%), and a balance of iron (Fe) and inevitable impurities, the slab further including at least one element selected from the group consisting of bismuth (Bi), tin (Sn), and antimony (Sb) in an amount of 0.01 wt % to 0.07 wt %; a process of reheating the slab to a temperature of 1000° C. to 1300° C.; a process of hot rolling the reheated slab at a finish rolling temperature of 800° C. to 950° C. to produce a hot-rolled steel sheet; a process of coiling the hot-rolled steel sheet at a temperature of 750° C. or less; a process of cold rolling the coiled steel sheet; a primary annealing process, in which the cold-rolled steel sheet is heated to a temperature of Ac3 or higher, maintained at the temperature, and cooled under an $H_2$-$N_2$ gas atmosphere having a dew point of −45° C. or lower; a secondary annealing process, in which the primary-annealed steel sheet is heated to a temperature of Ac1 to Ac3, maintained at the temperature, cooled at an average cooling rate of 20° C/s or higher to a temperature range between a martensite start temperature (Ms) and a martensite finish temperature (Mf), reheated to a reheating temperature higher than or equal to Ms, and maintained at the reheating temperature for one second or longer under an $H_2$-$N_2$ gas atmosphere having a dew point of −20° C. to 60° C.; and a process of hot-dip galvanizing the secondary-annealing steel sheet.

These processes (operations) will now be described in detail.

Process of Preparing Slab

A slab is prepared. The slab includes, by wt %, carbon (C): 0.1% to 0.3%, silicon (Si): 0.1% to 2.0%, aluminum (Al): 0.005% to 1.5%, manganese (Mn): 1.5% to 3.5%, phosphorus (P): 0.04% or less (excluding 0%), sulfur (S): 0.015% or less (excluding 0%), nitrogen (N): 0.02% or less (excluding 0%), and a balance of iron (Fe) and inevitable impurities, wherein the slab further includes at least one element selected from the group consisting of bismuth (Bi), tin (Sn), and antimony (Sb) in an amount of 0.01 wt % to 0.07 wt %.

Reasons for selecting the elements and the contents of the elements are the same as described above.

Reheating Process

The slab is reheated.

At this time, it may be preferable that the reheating temperature of the slab be within the range of 1000° C. to 1300° C. The slab is reheated to homogenize the slab before a hot rolling process. If the reheating temperature is lower than 1000° C., the load of a rolling mill may increase excessively. If the reheating temperature is higher than 1300° C., energy costs may increase, and surface scale may be formed excessively. Therefore, according to the embodiment, the slab reheating process may preferably be performed within the temperature range of 1000° C. to 1300° C.

Hot Rolling Process

The reheated slab is hot rolled to produce a hot-rolled steel sheet.

At this time, the hot rolling process may be performed, preferably at a finish rolling temperature ranging from 800° C. to 950° C. If the finish rolling temperature is lower than 800° C., the load of a rolling mill may markedly increase, and thus it may be difficult to roll the slab. If the finish rolling temperature is higher than 950° C., the lifespan of rolling rolls may decrease because of excessive thermal fatigue, and surface quality deterioration may occur because of the formation of a surface oxide layer. Therefore, the finish rolling temperature of the hot rolling process may be adjusted to be within the range of 800° C. to 950° C.

Coiling Process

The hot-rolled steel sheet is coiled.

At this time, the coiling process may be performed at a coiling temperature of 750° C. or lower. If the coiling temperature of the coiling process is excessively high, an excessive amount of scale may be formed on the hot-rolled steel sheet, thereby causing surface defects and deteriorating platability. Therefore, the coiling process may preferably be performed at a temperature of 750° C. or lower. In this case, the lower limit of the coiling temperature is not limited to a particular value. However, if the strength of the hot-rolled steel sheet is increased excessively, due to the formation of martensite, it may be difficult to perform the next cold rolling process. Thus, the coiling temperature may preferably be adjusted to be within the range of a martensite start temperature (Ms) to 750° C.

Cold Rolling Process

The coiled hot-rolled steel sheet is cold rolled.

The cold rolling process is performed to adjust the shape and thickness of the steel sheet. The reduction ratio of the cold rolling process is not limited to a particular value, as long as the thickness of the steel sheet is adjusted to an intended value. However, the reduction ratio of the cold rolling process may preferably be adjusted to be 25% or greater so as to suppress the formation of coarse ferrite during recrystallization in a later annealing process.

Primary Annealing Process

According to the embodiment of the present disclosure, the microstructure of the hot-dip galvanized steel sheet may include, by area fraction, polygonal ferrite in an amount of 5% or less, acicular ferrite in an amount of 70% or less, acicular retained austenite in an amount of 25% or less (excluding 0%), and the balance of martensite. The hot-dip galvanized steel sheet having the above-described microstructure may be formed by controlling the primary annealing process and a secondary annealing process (to be to be described later).

In particular, according to the embodiment of the present disclosure, an intended microstructure may be obtained by partitioning elements such as carbon (C) and manganese (Mn). In the related art, the partitioning is carried out by performing a quenching and partitioning (Q&P) annealing process continuously after the cold rolling process. However, in the embodiment, the primary annealing process is performed to form a low-temperature microstructure, and then the secondary annealing process (to be described later), including a quenching and partitioning (Q&P) heat treatment, is performed.

Hereinafter, the primary annealing process will be described in detail.

First, the primary annealing process is performed by heating the cold-rolled steel sheet to a temperature of Ac3 or higher, maintaining the cold-rolled steel sheet at the heating temperature, and cooling the cold-rolled steel sheet (refer to FIG. 1A). At this time, the time period during which the cold-rolled steel sheet is maintained at the heating temperature is not limited. However, the cold-rolled steel sheet may be maintained at the heating temperature for two minutes or less by taking productivity into consideration, and may then be cooled.

Then, the microstructure of the cold-rolled steel sheet heated to Ac3 or higher may have at least one selected from the group consisting of bainite and martensite as a main phase, in an amount of 90% or greater, by area fraction. In this case, if the heating temperature is lower than Ac3, soft polygonal ferrite may be formed in large amounts, and thus when the next secondary annealing process is performed, the soft polygonal ferrite may hinder the formation of a fine, final microstructure. Therefore, the heating temperature of the primary annealing process may preferably be set to be Ac3 or higher.

At this time, the primary annealing process may be performed in an annealing furnace filled with an $H_2$-$N_2$ atmosphere having hydrogen in an amount of 2 vol % or greater, so as to reduce Fe oxides formed on the surface of the cold-rolled steel sheet.

Furthermore, in the primary annealing process, the dew point in the annealing furnace may preferably be maintained to be −45° C. or lower, because the dew point has a significant effect on the degree of concentration of surface oxides of Si, Al, and Mn after the secondary annealing process. As the dew point of gas filled in the annealing furnace decreases in the primary annealing process, the diffusion of Mn is slowed, and the diffusion of Si and Al quickens. Thus, after the primary annealing process, complex oxides having high contents of Si and Al are formed on the surface of the steel sheet, but the contents of Si and Al are relatively low in a region below a surface region of the steel sheet. In the region in which the contents of Si and Al are low, at least one element selected from the group consisting of Bi, Sn, and Sb is concentrated.

However, if the dew point in the annealing furnace is higher than −45° C. during the primary annealing process, the surface diffusion of Si and Al occurs slowly, and the surface diffusion of Mn occurs quickly. Thus, after the primary annealing process, the content of Mn in the surface of the steel sheet is relatively high, and thus complex oxides of Mn, Si, and Al having a high Mn content are formed. However, Si and Al are not depleted or are insufficiently depleted in a region below the surface region of the steel sheet.

Therefore, in the manufacturing method of the embodiment, the dew point in the annealing furnace is adjusted to be −45° C. or less during the primary annealing process.

As described above, after the primary annealing process, complex oxides of Mn, Si, and Al, having high contents of Si and Al, are formed on the surface of the steel sheet, and the contents of Si and Al are low in a region below the surface region of the steel sheet. Instead, at least one element selected from the group consisting of Bi, Sn, and Sb is concentrated in the region below the surface region of the steel sheet. A layer in which the at least one element is concentrated prevents diffusion of Si and Al to the surface region of the steel sheet during the secondary annealing process (to be described later), and thus the contents of Si and Al in the surface region of the steel sheet decreases. As a result, the galvanizing characteristics of the hot-dip galvanized steel sheet of the embodiment may be markedly improved.

Figure 2:
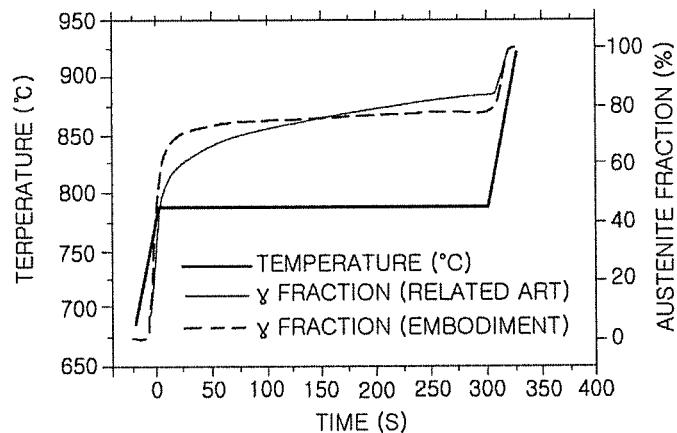
FIG. 2 is an example view illustrating different rates of transformation to austenite occurring in different initial microstructures during a heat treatment maintaining period in a secondary annealing process.

After the primary annealing process, the microstructure of the steel sheet includes at least one selected from the group consisting of bainite and martensite in an amount of 90% or greater by area fraction. Due to this, the cold-rolled steel sheet may have high strength and ductility after the secondary annealing process. If the fraction of such a low-temperature microstructure is less than 90% after the primary annealing process, it may be difficult to obtain a hot-dip, galvanized steel sheet having ferrite, retained austenite, and a low-temperature microstructure. For clear understanding, FIG. 2 illustrates different rates of transformation of austenite in different initial microstructures during a heat-treatment maintaining period in a secondary annealing process. Referring to the example shown in FIG. 2, when a heat-treatment maintaining period is 2 minutes or less in the secondary annealing process, the steel sheet of the embodiment processed through the primary annealing process, and having at least one selected from the group consisting of bainite and martensite in an amount of 90% or greater, by area fraction, may have an austenite fraction higher than that of a steel sheet of the related art not satisfying the microstructure of the embodiment.

As described above, after the primary annealing process performed in the annealing furnace filled with an $H_2$-$N_2$ gas atmosphere having a dew point of −45° C., at least one element selected from the group consisting of Bi, Sn, and Sb is concentrated in the steel sheet in a region from the surface of the steel sheet to a depth of 0.1 μm. However, the above-described feature of the hot-dip galvanized steel sheet of the embodiment, that is, the content of at least one element selected from the group consisting of Bi, Sn, and Sb in the base steel sheet in a depth of 0.1 μm or less being 2 to 20 times the content of the at least one element in the base steel sheet in a depth of 0.2 μm or greater, is not yet obtained after the primary annealing process. This feature will be obtained after the secondary annealing process.

Pickling Process

Optionally, according to the embodiment of the present disclosure, the method for manufacturing a hot-dip galvanized steel sheet may further include a pickling process after the primary annealing process.

In the pickling process, oxides formed on the steel sheet after the primary annealing process are removed. At this time, for example, the pickling process may be performed using a 2 vol % to 20 vol % hydrochloric acid solution. If the concentration of hydrochloric acid in the pickling solution is less than 2 vol %, it may be uneconomical, because it takes a long time to remove surface oxides, and if the concentration of hydrochloric acid is greater than 20 vol %, equipment may be contaminated by evaporated hydrochloric acid.

In the pickling process, any other acid may be used to remove surface oxides besides hydrochloric acid. That is, the pickling process is not limited to using hydrochloric acid. In addition, any pickling method well known in the related art, such as a dipping or spraying method, may be used without limitations.

In addition, after the steel sheet is picked by such a method, the steel sheet may be washed with water and dried.

Secondary Annealing Process

After the primary annealing process and the optional pickling process, a secondary annealing process is performed. The secondary annealing process may include a heat treatment, cooling, and reheating.

Figure 1B:
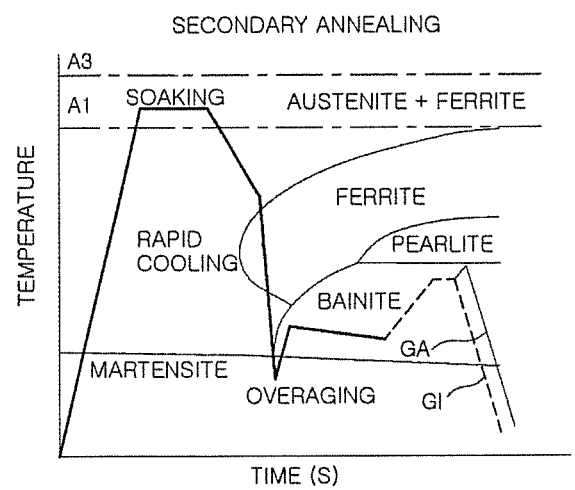
FIG. 1B illustrates an example of a secondary annealing process according to an embodiment of the present disclosure.

First, the heat treatment may be performed by heating the primary-annealed or pickled steel sheet to a temperature range of Ac1 to Ac3 and maintaining the steel sheet in the temperature range (refer to FIG. 1B).

During the heat treatment in the secondary annealing process, the steel sheet is heated to the temperature range of Ac1 to Ac3 so as to stabilize austenite by distributing alloying elements in the austenite and thus to guarantee the presence of retained austenite in a final microstructure of the steel sheet after cooling to room temperature. In addition, the heating to the temperature range and maintaining in the temperature range may induce reverse transformation of a low-temperature microstructure (bainite and martensite) formed after the primary annealing process and after partitioning of alloying elements such as C and Mn. For ease of description, this partitioning will now be referred to as primary partitioning.

The maintaining in the temperature range of Ac1 to Ac3 for primary partitioning of alloying elements is not limited to a particular time period, as long as the alloying elements are sufficiently diffused into austenite. However, if the maintaining time period is excessively long, productivity may decrease, and the effect of partitioning may be saturated. Thus, it may be preferable that the maintaining time period be 2 minutes or less.

After primary partitioning alloying elements, as described above, the steel sheet is cooled to a temperature range of a martensite start temperature (Ms) to a martensite finish temperature (Mf) and is then reheated to a temperature range of Ms or higher to re-induce partitioning of alloying elements. For ease of description, this partitioning will now be referred to as secondary partitioning.

At this time, the cooling to the temperature range of Ms to Mf may be performed at an average cooling rate of 20° C/s or greater so as to suppress the formation of polygonal ferrite. Furthermore, the cooling may include a slow cooling period immediately after the heat treatment in the secondary annealing process, so as to prevent problems such as off-centering of the steel sheet. In this case, when transformation to polygonal ferrite is suppressed as much as possible in the slow cooling period, the above-described microstructure and properties may be imparted to the hot-dip galvanized steel sheet of the embodiment.

In addition, reheating to the temperature range of Ms or greater may be performed within a temperature range of 500° C. or less. If the steel sheet is maintained for a long time within a temperature range of greater than 500° C. when reheated to the temperature range of Ms or greater, an intended microstructure may not be obtained because of a transformation of austenite to ferrite.

Figure 3:
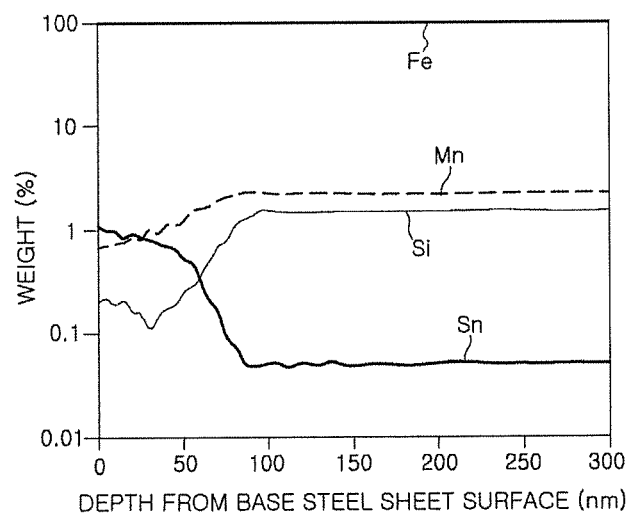
FIG. 3 illustrates results of composition analysis of a hot-dip galvanized steel sheet of Inventive Example 12, showing the contents of Fe, Mn, Si, and Sn in a region from the interface between a galvanized layer and a base steel sheet of the hot-dip galvanized steel sheet in the depth direction of the base steel sheet.

In addition, the dew point in an annealing furnace may primary be adjusted to be within the range of −20° C. to −60° C. during the secondary annealing process. If the dew point is higher than −20° C., some Si, Al, and Mn may be oxidized in the base steel sheet, and thus oxides may be present along grain boundaries of the base steel sheet. These internal oxides may easily break and cause cracks when the steel sheet is bent. In addition, if the dew point is lower than −60° C., even though a depletion region in which Si and Al are depleted is formed in the surface region of the base steel sheet after the primary annealing process, and a concentration layer having at least one element selected from the group consisting of Bi, Sn, and Sb is formed after the primary annealing process, some of the Si and Al existing below the depletion region may diffuse to the surface region, thereby forming complex oxides having high contents of Si and Al on the surface of the base steel sheet after the secondary annealing process. FIG. 3 illustrates results of composition analysis of a hot-dip galvanized steel sheet manufactured according to Inventive Example 12, showing the contents of Fe, Mn, Si, and Sn in a region beginning from the interface between a galvanized layer and a base steel sheet of the hot-dip galvanized steel sheet, in the depth direction of the base steel sheet. Referring to FIG. 3, a Sb-rich layer and a Si-lean region are formed, as described above.

In addition, the secondary annealing process may be performed in an annealing furnace filled with an $H_2$-$N_2$ atmosphere having hydrogen in an amount of 3 vol % or greater, so as to prevent surface oxidation of the primary-annealed steel sheet.

In addition, the secondary annealing process may be performed using a continuous hot-dip galvanizing apparatus so as to perform a plating process immediately after the secondary annealing process.

Hot-dip Galvanizing Process

After the secondary annealing process, the steel sheet is hot-dip galvanized.

This hot-dip galvanizing process may be performed according to a method well-known in the related art. That is, the hot-dip galvanizing process is not limited to a particular method. For example, the hot-dip galvanizing process may be performed by dipping the steel sheet in a hot-dip galvanizing bath having a temperature of 440° C. to 500° C., for adjusting the amount of plating, and cooling the steel sheet. In this case, if the temperature of the hot-dip galvanizing bath is lower than 440° C., rolls may not be easily driven in the hot-dip galvanizing bath because of a high viscosity of molten Zn, and if the temperature of the hot-dip galvanizing bath is higher than 500° C., evaporation of molten Zn may increase.

The hot-dip galvanizing bath may include Al in an amount of 0.1 wt % to 0.3 wt %, and the balance of Zn and inevitable impurities. If the content of Al in the hot-dip galvanizing bath is less than 0.1%, the formation of an Fe—Al alloy phase at the interface between the base steel sheet and a galvanized layer may be suppressed. Thus, it may be preferable that the lower limit of the content of Al be 0.1%. On the contrary, if the content of Al is greater than 0.3%, the content of Al in the galvanized layer may increase, and thus weldability may decrease.

Alloying Process

Optionally, the manufacturing method of the embodiment may further include an alloying process after the hot-dip galvanizing process.

In this case, it may be preferable that the upper limit of the content of Al in the hot-dip galvanizing bath be set to be 0.15%, so as to increase the rate of alloying. In addition, an alloyed hot-dip galvanized layer may have Fe in an amount of 7 wt % to 13 wt %. For this, the temperature of the alloying process may preferably be adjusted to be within the range of 500° C. to 600° C.

MODE FOR INVENTION

Hereinafter, the present disclosure will be described more specifically, according to examples. However, the following examples should be considered in a descriptive sense only and not for purposes of limitation. The scope of the present invention is defined by the appended claims, and modifications and variations may be reasonably made therefrom.

Inventive Examples 1 to 21 and Comparative Examples 1 to 18)

Steels A to I, having elements and contents thereof, as shown in Tables 1 and 2 below, were vacuum melted to produce ingots having a thickness of 90 mm and a width of 175 mm, and then the ingots were reheated at 1200° C. for one hour, for homogenization. Then, a finish hot rolling process was performed on the ingots at 900° C., which is equal to or higher than Ar3, so as to produce hot-rolled steel sheets.

Next, the hot-rolled steel sheets were cooled and inserted into a heating furnace previously heated to 600° C., in which the hot-rolled steel sheets were maintained for one hour and cooled to simulate coiling of hot-rolled steel sheets. Then, the hot-rolled steel sheets were cold rolled at a reduction ratio of 50% to 60%. Thereafter, the cold-rolled steel sheets were heated to a primary annealing temperature and cooled so that the cold-rolled steel sheets might have microstructures as shown in Table 4 below. In this case, the primary annealing temperature and the dew point in a primary annealing furnace were adjusted, as shown in Table 4 below, and an $H_2$-$N_2$ gas having a hydrogen content of 5 vol % was used as an atmosphere gas in the primary annealing furnace.

Thereafter, the primary-annealed steel sheets were pickled for 2 seconds with a 10 vol % hydrochloric acid solution that had been heated to 60° C. Then, the steel sheets were washed with water and dried, and a secondary annealing process was performed on the steel sheets, under the conditions shown in Table 5. In this case, an $H_2$-$N_2$ gas having a hydrogen content of 5 vol % was used as an atmosphere gas in a secondary annealing furnace. Immediately after the secondary annealing process, a hot-dip galvanizing process was performed to produce hot-dip galvanized steel sheets. In this case, the plating weight on each side of the hot-dip galvanized steel sheets was adjusted to be 60 g/m², and the plating weight on each side of the alloyed hot-dip galvanized steel sheets was adjusted to be 45 g/m².

In the primary annealing process and the secondary annealing process, a bainite start temperature (Bs), a martensite start temperature (Ms), a temperature at which austenite starts to form during heating (Ac1), and a temperature at which ferrite completely disappears and austenite single phase heating starts during heating (Ac3) were determined using the following well-known equations. In the following equations, each element refers to the weight percent (wt %) of the element. These temperatures are shown in Table 3 below.

Bs=830-270C-90Mn-37Ni-70Cr-83Mo

Ms=539-423C-30.4Mn-12.1Cr-17.7Ni-7.5Mo

Ac1=723-10.7Mn-16.9Ni+29.1Si+16.9Cr+290As+6.38W

Ac3=910-203√C-15.2Ni+44.7Si+104V+31.5Mo+13.1W-30Mn-11Cr-0Cu+700P+400Al+120As+400Ti

TABLE 1

(Unit: wt %)

| Steels | C | Si | Mn | Ni | P | S | So. Al |
|---|---|---|---|---|---|---|---|
| A | 0.15 | 1.51 | 2.21 | — | 0.011 | 0.005 | 0.03 |
| B | 0.18 | 1.45 | 2.22 | — | 0.012 | 0.004 | 0.51 |
| C | 0.20 | 1.60 | 2.80 | — | 0.010 | 0.003 | 0.05 |
| D | 0.24 | 1.53 | 2.11 | 0.5 | 0.013 | 0.005 | 0.03 |
| E | 0.21 | 1.50 | 2.60 | — | 0.011 | 0.004 | 0.04 |
| F | 0.18 | 1.41 | 2.60 | — | 0.012 | 0.004 | 0.49 |
| G | 0.08 | 1.38 | 1.71 | — | 0.011 | 0.005 | 0.04 |
| H | 0.15 | 1.51 | 2.21 | — | 0.011 | 0.005 | 0.03 |
| I | 0.24 | 1.53 | 2.11 | 0.5 | 0.013 | 0.005 | 0.03 |

TABLE 2

(Unit: wt %)

| Steels | Ti | Nb | B | N | Bi | Sb | Sn | Others |
|---|---|---|---|---|---|---|---|---|
| A | — | — | — | 0.003 | 0.02 | — | — | — |
| B | 0.021 | — | 0.0011 | 0.004 | — | 0.03 | — | Cr 0.05 |
| C | — | — | — | 0.004 | 0.04 | 0.01 | — | Mo 0.05 |
| D | — | — | — | 0.004 | — | — | 0.05 | — |
| E | 0.020 | — | — | 0.004 | 0.02 | — | 0.02 | — |
| F | 0.019 | 0.024 | — | 0.004 | — | 0.02 | 0.03 | V 0.005 |
| G | — | — | — | 0.003 | — | — | — | — |
| H | — | — | — | 0.003 | — | — | — | — |
| I | — | — | — | 0.004 | 0.002 | — | — | — |

TABLE 3

(Unit: ° C.)

| Steels | Bs (° C.) | Ms (° C.) | Ac1 (° C.) | Ac3 (° C.) |
|---|---|---|---|---|
| A | 591 | 408 | 743 | 852 |
| B | 578 | 395 | 742 | 1042 |
| C | 520 | 369 | 740 | 835 |
| D | 557 | 364 | 736 | 829 |
| E | 539 | 371 | 739 | 838 |
| F | 547 | 384 | 736 | 1021 |
| G | 655 | 453 | 745 | 887 |
| H | 591 | 408 | 743 | 852 |
| I | 557 | 364 | 736 | 829 |

TABLE 4

| Steels | Examples | ***PA Annealing Temperature (° C.) | ***PA Dew Point (° C.) | Microstructure before ****SA | Pickling after PA |
|---|---|---|---|---|---|
| A | *CE 1 | 790 | −55 | Martensite | o |
|   | CE 2 | 790 | −10 | Martensite | o |
|   | CE 3 | 790 | −55 | Bainite | o |
|   | **IE 1 | 790 | −65 | Bainite | x |
|   | IE 2 | 790 | −65 | Martensite | o |
|   | IE 3 | 790 | −47 | Martensite | o |
|   | IE 4 | 790 | −47 | Bainite | o |
| B | CE 4 | — | — | Cold-rolled | — |
|   | CE 5 | — | — | Cold-rolled | — |
|   | CE 6 | 790 | −55 | Martensite | o |
|   | CE 7 | 790 | +5 | Martensite | o |
|   | IE 5 | 790 | −50 | Martensite | x |
|   | IE 6 | 790 | −75 | Martensite | o |

TABLE 4-continued

| Steels | Examples | PA Annealing Temperature (°C.) | Dew Point (°C.) | Microstructure before SA | Pickling after PA |
|---|---|---|---|---|---|
|  | IE 7 | 790 | −75 | Martensite | ○ |
|  | IE 8 | 790 | −65 | Bainite | ○ |
|  | IE 9 | 790 | −65 | Bainite | ○ |
| C | CE 8 | — | — | Cold-rolled | — |
|  | CE 9 | 790 | −46 | Martensite | ○ |
|  | IE 10 | 790 | −50 | Martensite | ○ |
|  | IE 11 | 790 | −50 | Martensite | ○ |
|  | IE 12 | 790 | −50 | Martensite | ○ |
| D | IE 13 | 790 | −50 | Martensite | ○ |
|  | IE 14 | 790 | −50 | Martensite | ○ |
| E | CE 10 | — | — | Cold-rolled | — |
|  | CE 11 | 790 | −50 | Martensite | ○ |
|  | CE 12 | 790 | −50 | Martensite | ○ |
|  | IE 15 | 790 | −60 | Martensite | ○ |
|  | IE 16 | 790 | −50 | Martensite | ○ |
|  | IE 17 | 790 | −70 | Martensite | ○ |
| F | CE 13 | 790 | −50 | Martensite | ○ |
|  | IE 18 | 790 | −50 | Martensite | x |
|  | IE 19 | 790 | −50 | Martensite | ○ |
|  | IE 20 | 790 | −48 | Martensite | ○ |
|  | IE 21 | 790 | −55 | Bainite | ○ |
| G | CE 14 | 790 | −50 | Martensite | ○ |
| H | CE 15 | 790 | −50 | Martensite | ○ |
|  | CE 16 | 790 | −50 | Martensite | ○ |
| I | CE 17 | 790 | −50 | Martensite | x |
|  | CE 18 | 790 | −50 | Martensite | ○ |

*CE: Comparative Example,
**IE: Inventive Example,
***PA: Primary Annealing,
****SA: Secondary Annealing

TABLE 5

| Steels | Examples | Secondary Annealing Annealing Temp. (°C.) | Cooling Temp. between Ms and Mf (°C.) | Reheating Temp. (°C.) | Overaging Temp. (°C.) | Dew Point (°C.) | Plating Conditions Al (wt %) in Plating Bath | Alloying Temp. (°C.) |
|---|---|---|---|---|---|---|---|---|
| A | *CE 1 | 790 | none | none | 440 | −55 | 0.22 | — |
|  | CE 2 | 790 | 250 | 440 | none | −55 | 0.22 | — |
|  | CE 3 | 790 | 350 | 440 | none | −5 | 0.22 | — |
|  | **IE 1 | 790 | 350 | 440 | none | −45 | 0.22 | — |
|  | IE 2 | 790 | 250 | 440 | none | −55 | 0.22 | — |
|  | IE 3 | 790 | 350 | 440 | none | −55 | 0.22 | — |
|  | IE 4 | 790 | 350 | 440 | none | −55 | 0.22 | — |
| B | CE 4 | 790 | 250 | 440 | none | −55 | 0.22 | — |
|  | CE 5 | 790 | 350 | 440 | none | −40 | 0.22 | — |
|  | CE 6 | 790 | none | none | 440 | −55 | 0.22 | — |
|  | CE 7 | 790 | 250 | 440 | none | +5 | 0.22 | — |
|  | IE 5 | 790 | 250 | 440 | none | −40 | 0.22 | — |
|  | IE 6 | 790 | 250 | 440 | none | −40 | 0.22 | — |
|  | IE 7 | 790 | 350 | 440 | none | −35 | 0.22 | — |
|  | IE 8 | 790 | 350 | 440 | none | −40 | 0.22 | — |
|  | IE 9 | 790 | 350 | 440 | none | −45 | 0.128 | 545 |
| C | CE 8 | 790 | 250 | 440 | none | −40 | 0.22 | — |
|  | CE 9 | 790 | 250 | 440 | none | −80 | 0.22 | — |
|  | IE 10 | 790 | 250 | 440 | none | −55 | 0.22 | — |
|  | IE 11 | 790 | 350 | 440 | none | −55 | 0.22 | — |
|  | IE 12 | 790 | 350 | 440 | none | −55 | 0.132 | 560 |
| D | IE 13 | 790 | 250 | 440 | none | −55 | 0.22 | — |
|  | IE 14 | 790 | 350 | 440 | none | −55 | 0.22 | — |
| E | CE 10 | 790 | 350 | 440 | none | −40 | 0.22 | — |
|  | CE 11 | 790 | none | none | 440 | −55 | 0.22 | — |
|  | CE 12 | 790 | 250 | 440 | none | −55 | 0.22 | 580 |
|  | IE 15 | 790 | 250 | 440 | none | −40 | 0.22 | — |
|  | IE 16 | 790 | 350 | 440 | none | −55 | 0.22 | — |
|  | IE 17 | 790 | 350 | 440 | none | −55 | 0.13 | 550 |
| F | CE 13 | 790 | none | none | 440 | −40 | 0.20 | — |
|  | IE 18 | 790 | 250 | 440 | none | −55 | 0.20 | — |
|  | IE 19 | 790 | 250 | 440 | none | −55 | 0.20 | — |
|  | IE 20 | 790 | 350 | 440 | none | −40 | 0.18 | — |
|  | IE 21 | 790 | 350 | 440 | none | −55 | 0.18 | — |
| G | CE 14 | 790 | 350 | 440 | none | −55 | 0.22 | — |
| H | CE 15 | 790 | 250 | 440 | none | −40 | 0.22 | — |
|  | CE 16 | 790 | 350 | 440 | none | −55 | 0.22 | — |

TABLE 5-continued

| | | Secondary Annealing | | | | Plating Conditions | |
|---|---|---|---|---|---|---|---|
| | | | Cooling Temp. | | | | |
| Steels | Examples | Annealing Temp. (° C.) | between Ms and Mf (° C.) | Reheating Temp. (° C.) | Overaging Temp. (° C.) | Dew Point (° C.) | Al (wt %) in Plating Bath | Alloying Temp. (° C.) |
| I | CE 17 | 790 | 250 | 440 | none | −55 | 0.22 | |
| | CE 18 | 790 | 350 | 440 | none | −55 | 0.13 | 538 |

*CE: Comparative Example,
**IE: Inventive Example

※ In Tables 4 and 5,

When the primary annealing process was not performed, "cold-rolled" is written in the field, "Microstructure before Secondary Annealing (SA)".

When a general annealing process was performed instead of a Q&P process, "none" is written in the sub-fields, "Cooling Temperature between Ms and Mf" and "Reheating Temperature", of the field "Secondary Annealing." In this case, a heat treatment was performed at a temperature shown in the field, "Overaging Temperature." When a Q&P process was performed, "none" is written in the field, "Overaging Temperature."

Experimental Example 1

Measurements of Yield Strength, Tensile Strength, and Elongation

The yield strength, tensile strength, and elongation of hot-dip galvanized steel sheets produced according to Inventive Examples 1 to 21 and Comparative Examples 1 to 18 were measured, and results thereof are shown in Table 6, below.

Experimental Example 2

Degree of Enrichment Measurement

The degree of concentration of Bi, Sb, and/or Sn in a surface region of a base steel sheet of each of the hot-dip galvanized steel sheets of Inventive Examples 1 to 21 and Comparative Example s 1 to 18 was observed by making a section with a focused ion beam and obtaining a composition profile by 3D atom probe topography (APT). The contents of Bi, Sb, and/or Sn were measured at an internal point of the base steel sheet located 0.05 μm from the interface between the base steel sheet and a galvanized layer, and at an internal point of the base steel sheet located 0.25 μm from the interface. Ratios of the contents of Bi, Sb, and/or Sn at the 0.05-μm point to the contents of Bi, Sb, and/or Sn at the 0.25-μm point were calculated, as shown in Table 6 below.

For example, the degree of concentration of Bi was calculated using the following equation.

A degree of concentration of Bi={Bi content (wt %) at a depth of 0.05 μm from the surface of a base steel sheet/Bi content (wt %) at a depth of 0.25 μm from the surface of the base steel sheet}.

TABLE 6

| | | Properties | | | Degree of |
|---|---|---|---|---|---|
| Steels | Examples | ***YS (MPa) | ****TS (MPa) | *****El (%) | concentration of Bi, Sn, Sb |
| A | *CE 1 | 562 | 842 | 23.8 | Bi 4.3 |
| | CE 2 | 574 | 846 | 27.9 | Bi 3.8 |
| | CE 3 | 568 | 872 | 27.5 | Bi 3.3 |
| | **IE 1 | 569 | 871 | 27.8 | Bi 4.9 |
| | IE 2 | 576 | 850 | 28.0 | Bi 4.3 |
| | IE 3 | 568 | 872 | 27.5 | Bi 4.1 |
| | IE 4 | 540 | 868 | 24.6 | Bi 4.1 |
| B | CE 4 | 380 | 1060 | 16.5 | Sb 2.9 |
| | CE 5 | 365 | 982 | 17.1 | Sb 2.9 |
| | CE 6 | 461 | 1033 | 15.2 | Sb 4.2 |
| | CE 7 | 598 | 986 | 21.1 | Sb 5.9 |
| | IE 5 | 506 | 995 | 22.5 | Sb 5.6 |
| | IE 6 | 505 | 996 | 22.3 | Sb 6.9 |
| | IE 7 | 471 | 1005 | 21.1 | Sb 6.4 |
| | IE 8 | 454 | 1020 | 18.5 | Sb 6.1 |
| | IE 9 | 467 | 1002 | 19.8 | — |
| C | CE 8 | 419 | 1136 | 15.3 | Bi 3.8, Sb 1.4 |
| | CE 9 | 513 | 1177 | 18.2 | Bi 9.2, Sb 2.4 |
| | IE 10 | 510 | 1186 | 18.3 | Bi 9.8, Sb 2.6 |
| | IE 11 | 502 | 1175 | 18.6 | Bi 9.7, Sb 2.3 |
| | IE 12 | 522 | 1166 | 18.8 | — |
| D | IE 13 | 591 | 986 | 26.9 | Sn 10.6 |
| | IE 14 | 550 | 1008 | 25.9 | Sn 10.6 |
| E | CE 10 | 480 | 1286 | 14.6 | Bi 3.8, Sn 3.6 |
| | CE 11 | 629 | 1240 | 15.4 | Bi 6.8, Sn 7.6 |
| | CE 12 | 517 | 1206 | 17.2 | Bi 3.8, Sn 3.6 |
| | IE 15 | 506 | 1205 | 17.1 | Bi 6.9, Sn 7.2 |
| | IE 16 | 515 | 1247 | 18.1 | Bi 7.1, Sn 7.2 |
| | IE 17 | 515 | 1247 | 18.1 | — |
| F | CE 13 | 535 | 1180 | 12.1 | Sb 6.9, Sn 9.2 |
| | IE 18 | 552 | 1249 | 15.9 | Sb 6.7, Sn 9.6 |
| | IE 19 | 554 | 1248 | 15.7 | Sb 6.6, Sn 9.3 |
| | IE 20 | 564 | 1250 | 14.6 | Sb 6.8, Sn 9.2 |
| | IE 21 | 544 | 1256 | 13.6 | Sb 6.7, Sn 9.5 |
| G | CE 14 | 463 | 644 | 32.7 | — |
| H | CE 15 | 576 | 850 | 28.0 | — |
| | CE 16 | 568 | 872 | 27.5 | — |
| I | CE 17 | 591 | 986 | 26.9 | Bi 1.1 |
| | CE 18 | 550 | 1008 | 25.9 | — |

*CE: Comparative Example,
**IE: Inventive Example,
***YS: Yield Strength,
****TS: Tensile Strength,
*****El: Elongation Referring to Table 6, the elongation of hot-dip galvanized steel sheets was improved when primary annealing was performed for transformation to martensite and/or bainite, and then secondary annealing was performed according to the present disclosure, compared to the case in which secondary annealing was performed without performing primary annealing.

For example, when the hot-dip galvanized steel sheet produced using Steel E, according to Comparative Example 10, in which secondary annealing was performed on a cold-rolled microstructure without performing primary annealing, is compared with the hot-dip galvanized steel sheet produced using Steel E, according to Inventive Example 16, in which primary annealing was performed to form martensite, and then secondary annealing was performed, the hot-dip galvanized steel sheets of Comparative Example 10 and Inventive Example 16 were similar in strength, but elongation values of the hot-dip galvanized steel sheets of Comparative Example 10 and Inventive Example 16 were 14.6% and 18.1%, respectively. That is, elongation was improved by 24% (=(18.1-14.6)/14.6*100) when the microstructure was controlled through primary annealing before secondary annealing, according to the present disclosure. If a Q&P process is performed on a cold-rolled steel sheet, as in the related art, polygonal ferrite is formed in the cold-rolled steel sheet, due to a heat treatment. However, according to the manufacturing method of the present disclosure, the fraction of polygonal ferrite may be markedly reduced, and the formation of acicular ferrite and acicular austenite may be guaranteed.

In Comparative Example 11, the formation of martensite was ensured by primary annealing, but a general annealing-overaging process was performed instead of performing a Q&P process during secondary annealing. Elongation values of the hot-dip galvanized steel sheets of Comparative Example 11 and Inventive Example 16 were 15.4% and 18.1%, respectively. That is, according to Inventive Example 16, in which the manufacturing method of the present disclosure was used, elongation was improved by 18% (=(18.1-14.6)/14.6*100). An increase in the driving force of partitioning, obtained by reheating after cooling to a temperature between Ms and Mf, is considered to be the reason for this.

A general annealing-overaging process may include a 450° C. or lower heat treatment section, called "an overaging section", in which low carbon steel is averaged, to precipitate carbides. However, the heat treatment section facilitates bainite transformation when manufacturing transformation-induced plasticity (TRIP) steel. In general, the heat treatment section is called "overaging." Thus, the heat treatment section is referred to as "overaging" in the present disclosure.

Although annealing is performed, according to the present disclosure, the hot-dip galvanized steel sheet of Comparative Example 14, manufactured using Steel G, having an insufficient amount of C, did not have an intended degree of strength.

In the case of the hot-dip galvanized steel sheets of Inventive Examples 1 to 8, 10, 11, 13 to 16, and 19 to 21, manufactured using steels A to F containing at least one of Bi, Sn, and Sb in an amount of 0.01 wt % to 0.07 wt %, the content of Bi, Sn, and/or Sb in a region from the interface of a base steel sheet and a galvanizing layer to a depth of 0.05 μm in the base steel sheet was two or more times the content of Bi, Sn, and/or Sb, at a depth of 0.25 μm in the base steel sheet. This shows that surface diffusion of Si and Al was suppressed, and complex oxides of Si, Al, and Mn were concentrated on the surfaces of the steel sheets after final annealing.

Experimental Example 3

Measurement of Cracking

The hot-dip galvanized steel sheets of Inventive Examples 1 to 21 and Comparative Examples 1 to 18 were bent to an internal angle of 90°, using a die having a radius of curvature of 1 mm, and cracking was observed. Results of the observation are shown in Table 7, below.

Experimental Example 4

Surface Quality Measurement

Non-plated regions and the degree of plating failure were observed with the naked eye and an optical microscope from the hot-dip galvanized steel sheets of Inventive Examples 1 to 21 and Comparative Examples 1 to 18, and results thereof are shown in Table 7, below. Criteria of the evaluation are as follows:

⊚ Excellent (steel sheet having no plating failure within an area of 100 m$^2$)

○ Good (steel sheet on which a non-plated region having a size of less than 0.2 mm was observed within an area of 100 cm$^2$)

Δ Satisfactory (steel sheet on which a non-plated region having a size of 0.2 mm to 1 mm was observed within an area of 100 cm$^2$)

× Very poor (steel sheet on which a non-plated region having a size of greater than 1 mm was observed within an area of 100 cm$^2$)

Experimental Example 5

Coating Adhesion Measurement

An adhesive for automotive structural members was applied to the hot-dip galvanized steel sheets of Inventive Examples 1 to 21 and Comparative Examples 1 to 18, and after the adhesive was dried, the hot-dip galvanized steel sheets were bent to an internal angle of 90°. Then, the plating layers were checked as to whether they had separated because of the adhesive or not, and results thereof are shown in Table 7, below. Criteria of the evaluation are as follows.

To check the coating adhesion of alloyed hot-dip galvanized steel sheets of Inventive Examples 9, 12, and 17, and Comparative Examples 12 and 18, the content of Fe in each alloyed hot-dip galvanized layer was measured, as shown in Table 7, below.

TABLE 7

| Steels | Examples | Cracking after 90° Bending | Surface Quality | Coating Cohesion | Fe Content in Plating Layer |
|---|---|---|---|---|---|
| A | *CE 1 | No | ⊚ | No Separation | — |
|   | CE 2 | Yes | ○ | No Separation | — |
|   | CE 3 | Yes | ⊚ | No Separation | — |
|   | **IE 1 | No | Δ | No Separation | — |
|   | IE 2 | No | ⊚ | No Separation | — |
|   | IE 3 | No | ⊚ | No Separation | — |
|   | IE 4 | No | ⊚ | No Separation | — |
| B | CE 4 | No | ○ | No Separation | — |
|   | CE 5 | No | ○ | No Separation | — |
|   | CE 6 | No | ⊚ | No Separation | — |
|   | CE 7 | Yes | ⊚ | No Separation | — |
|   | IE 5 | No | Δ | No Separation | — |
|   | IE 6 | No | ⊚ | No Separation | — |
|   | IE 7 | No | ⊚ | No Separation | — |
|   | IE 8 | No | ⊚ | No Separation | — |
|   | IE 9 | — | ⊚ | — | 8.9 |
| C | CE 8 | No | ○ | No Separation | — |
|   | CE 9 | No | Δ | Separation | — |
|   | IE 10 | No | ⊚ | No Separation | — |
|   | IE 11 | No | ⊚ | No Separation | — |
|   | IE 12 | — | ⊚ | — | 9.5 |

TABLE 7-continued

| Steels | Examples | Cracking after 90° Bending | Surface Quality | Coating Cohesion | Fe Content in Plating Layer |
|---|---|---|---|---|---|
| D | IE 13 | No | ◎ | No Separation | — |
|   | IE 14 | No | ◎ | No Separation | — |
| E | CE 10 | No | ○ | No Separation | — |
|   | CE 11 | No | ◎ | No Separation | — |
|   | CE 12 | — | ◎ | — | 1.3 |
|   | IE 15 | No | ◎ | No Separation | — |
|   | IE 16 | No | ◎ | No Separation | — |
|   | IE 17 | — | ◎ | — | 9.9 |
| F | CE 13 | No | ◎ | No Separation | — |
|   | IE 18 | No | Δ | No Separation | — |
|   | IE 19 | No | ◎ | No Separation | — |
|   | IE 20 | No | ◎ | No Separation | — |
|   | IE 21 | No | ◎ | No Separation | — |
| G | CE 14 | No | X | Separation | — |
| H | CE 15 | No | X | Separation | — |
|   | CE 16 | No | X | Separation | — |
| I | CE 17 | No | X | Separation | — |
|   | CE 18 | — | X | — | 8.2 |

*CE: Comparative Example,
**IE: Inventive Example

As shown in Table 7, the hot-dip galvanized steel sheets of Inventive Examples 1 to 21 manufactured according to the manufacturing method of the present disclosure had no crack in the base steel sheets thereof after being bent to 90°, and had high surface quality and coating adhesion. The reason for this may be that the base steel sheets had no internal oxides and no improved wettability by means of adding molten zinc.

The alloyed hot-dip galvanized steel sheets of Inventive Examples 9, 12, and 17, manufactured using steels A to F satisfying the composition conditions of the present disclosure, had no plating failure and an Fe content in an amount of 8.9 wt % to 9.5 wt %.

The hot-dip galvanized steel sheets of Inventive Examples 1, 5, and 18 were not pickled during manufacturing processes, and thus had surface quality lower than the surface quality of the hot-dip galvanized steel sheets of other inventive examples. However, the hot-dip galvanized steel sheets of Inventive Examples 1, 5, and 18 had satisfactory surface quality and did not show plating separation in a coating adhesion test. Thus, the hot-dip galvanized steel sheets of Inventive Examples 1, 5, and 18 may be used as products.

In Comparative Example 2, steel A, satisfying the composition conditions of the present disclosure, was used, but the dew point in an annealing furnace was higher than a range proposed in the present disclosure. Thus, complex oxides of Mn, Si, and Al were formed in the steel sheet after annealing, and thus the base steel sheet was cracked when being bent.

In Comparative Example 3, steel A, satisfying the composition conditions of the present disclosure, was used, but the dew point in an annealing furnace was higher than a range proposed in the present disclosure. Thus, complex oxides of Mn, Si, and Al were formed in the steel sheet after annealing, and thus the base steel sheet was cracked when being bent.

In Comparative Example 7, during primary annealing and secondary annealing, the dew point in an annealing furnace was higher than a range proposed in the present disclosure, and thus the base steel sheet was cracked when being bent.

In Comparative Example 9, the dew point in an annealing furnace was lower than a range proposed in the present disclosure. Thus, a Si-lean or Al-lean region was formed in a surface region of the base steel sheet by primary annealing and, although a layer in which Bi and Sb were concentrated was present, some of the Si and Al diffused from a region below the lean region toward the surface of the base steel sheet. As a result, after annealing, complex oxides having high contents of Si and Al were formed, and thus plating separation occurred, even though satisfactory surface quality was obtained.

In Comparative Example 12, the alloyed hot-dip galvanized steel sheet was produced, using a plating bath having an Al content higher than a range proposed in the present disclosure. Therefore, little alloying occurred in a plating process, and thus a hot-dip galvanized layer had a very low Fe content, on the level of 1.3%.

In Comparative Examples 14 to 16, the hot-dip galvanized steel sheets were produced, using steels F and G, in which Bi, Sn, or Sb was not included, according to the manufacturing method of the present disclosure. Although the strength and elongation of the hot-dip galvanized steel sheets were high, the hot-dip galvanized steel sheets had very poor surface quality and low coating adhesion, and showed plating separation.

In Comparative Examples 17 and 18, steel I, having a Bi content lower than the range proposed in the present disclosure, was used. In Comparative Example 17, the degree of concentration of Bi was lower than the range proposed in the present disclosure, and thus surface diffusion of Si, Mn, and Al was not sufficiently suppressed, and surface oxides formed during the primary annealing did not dissolve, thereby causing very poor surface quality and plating separation. In Comparative Example 18, an alloyed hot-dip galvanized layer was formed, but surface quality was very poor.

Based on the results described above, it could be understood that the hot-dip galvanized steel sheet of the present disclosure has high strength and elongation for high workability and formability. In addition, cracks may not be formed in the base steel sheet, even when the hot-dip galvanized steel sheet is bent, and the hot-dip galvanized steel sheet may have high surface quality and coating adhesion.

While embodiments have been shown and described above, the scope of the present invention is not limited thereto, and it will be apparent to those skilled in the art that modifications and variations could be made without departing from the scope of the present invention, as defined by the appended claims.

The invention claimed is:

1. An ultra-high strength, hot-dip galvanized steel sheet having high surface quality and coating adhesion, comprising a base steel sheet and a galvanized layer formed on the base steel sheet,
wherein the base steel sheet comprises, by wt %, carbon (C): 0.1% to 0.3%, silicon (Si): 0.1% to 2.0%, aluminum (Al): 0.005% to 1.5%, manganese (Mn): 1.5% to 3.5%, phosphorus (P): 0.04% or less (excluding 0%), sulfur (S): 0.015% or less (excluding 0%), nitrogen (N): 0.02% or less (excluding 0%), at least one element selected from the group consisting of bismuth (Bi), tin (Sn), and antimony (Sb) in an amount of 0.01 wt % to 0.07 wt %, and a balance of iron (Fe) and inevitable impurities,
wherein a degree of concentration of at least one element selected from the group consisting of Bi, Sn, and Sb in a region of the base steel sheet defined as being from an interface between the base steel sheet and the galvanized layer to a depth of 0 to 0.1 μm, is 2 times to 20 times a degree of concentration of the at least one element in a region of the base steel sheet, defined to be within a depth range of 0.2 μm or greater.

2. The ultra-high strength, hot-dip galvanized steel sheet of claim 1, wherein the base steel sheet has a total content of Si and Al in an amount of 1.0 wt % or greater.

3. The ultra-high strength, hot-dip galvanized steel sheet of claim 1, wherein the base steel sheet has a microstructure comprising, by area fraction, polygonal ferrite in an amount of 5% or less, acicular ferrite in an amount of 70% or less, acicular retained austenite in an amount of 25% or less (excluding 0%), and a balance of martensite.

4. The ultra-high strength, hot-dip galvanized steel sheet of claim 1, wherein the galvanized layer has an Fe content within a range of 7 wt % to 13 wt %.

5. The ultra-high strength, hot-dip galvanized steel sheet of claim 1, wherein the ultra-high strength, hot-dip galvanized steel sheet has a tensile strength of 780 MPa or greater.

6. The ultra-high strength, hot-dip galvanized steel sheet of claim 1, wherein the base steel sheet further comprises, by wt %, at least one element selected from the group consisting of titanium (Ti): 0.005% to 0.1%, niobium (Nb): 0.005% to 0.1%, vanadium (V): 0.005% to 0.1%, zirconium (Zr): 0.005% to 0.1%, and tungsten (W): 0.005% to 0.5%.

7. The ultra-high strength, hot-dip galvanized steel sheet of claim 1, wherein the base steel sheet further comprises, by wt %, at least one element selected from the group consisting of molybdenum (Mo): 1% or less (excluding 0%), nickel (Ni): 1% or less (excluding 0%), copper (Cu): 0.5% or less (excluding 0%), and chromium (Cr): 1% or less (excluding 0%).

8. The ultra-high strength, hot-dip galvanized steel sheet of claim 1, wherein the base steel sheet further comprises, by wt %, at least one element selected from the group consisting of calcium (Ca): 0.01% or less (excluding 0%), and boron (B): 0.01% or less (excluding 0%).

* * * * *